US011215785B2

(12) United States Patent
Tam et al.

(10) Patent No.: US 11,215,785 B2
(45) Date of Patent: Jan. 4, 2022

(54) SELECTIVE DEFOCUS OF CAMERAS

(71) Applicant: HEWLETT-PACKARD DEVELOPMENT COMPANY, L.P., Spring, TX (US)

(72) Inventors: Alan Man Pan Tam, Houston, TX (US); Tony Moon, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 94 days.

(21) Appl. No.: 16/481,119

(22) PCT Filed: Jul. 13, 2017

(86) PCT No.: PCT/US2017/041933
§ 371 (c)(1),
(2) Date: Jul. 26, 2019

(87) PCT Pub. No.: WO2019/013804
PCT Pub. Date: Jan. 17, 2019

(65) Prior Publication Data
US 2021/0132325 A1    May 6, 2021

(51) Int. Cl.
*G02B 7/04* (2021.01)
*G03B 13/34* (2021.01)
*G02B 7/08* (2021.01)

(52) U.S. Cl.
CPC ............ *G02B 7/04* (2013.01); *G02B 7/08* (2013.01); *G03B 13/34* (2013.01); *G03B 2217/18* (2013.01)

(58) Field of Classification Search
CPC .................... G03B 13/34; G03B 2217/18
See application file for complete search history.

(56) References Cited

U.S. PATENT DOCUMENTS

| 5,949,474 | A | 9/1999 | Gerszberg et al. |
| 6,864,474 | B2 | 3/2005 | Misawa |
| 7,538,803 | B2 | 5/2009 | Kurosawa |
| 8,724,016 | B2 | 5/2014 | Tsai |
| 8,988,532 | B2 | 3/2015 | Soffer |
| 2006/0105806 | A1 | 5/2006 | Vance et al. |
| 2006/0238517 | A1* | 10/2006 | King ................. G06F 3/03547 345/173 |
| 2008/0044171 | A1 | 2/2008 | Hyatt |
| 2008/0117303 | A1* | 5/2008 | Furumochi ........ H04N 5/23248 348/208.2 |
| 2011/0134246 | A1 | 6/2011 | Von Der Lippe et al. |
| 2016/0077636 | A1 | 3/2016 | Jordan et al. |
| 2017/0134639 | A1* | 5/2017 | Pitts ................... H04N 5/23218 |

OTHER PUBLICATIONS

Fix Your Laptop's Webcam, Jun. 2017.

* cited by examiner

*Primary Examiner* — Minh Q Phan
(74) *Attorney, Agent, or Firm* — Brooks, Cameron & Huebsch PLLC

(57) ABSTRACT

Example implementations relate the selective defocus of cameras. For instance, in an example an electronic device including a camera including a lens having a field of view and a focal distance, a defocus switch, and an actuator to adjust the focal distance of the lens to selectively defocus a portion of the field of view of the lens in response to actuation of the defocus switch.

15 Claims, 6 Drawing Sheets

SELECTIVE DEFOCUS OF CAMERAS

BACKGROUND

Computing systems such laptop computers, desktop computers, various phones such as mobile phones, etc. may include a camera. The camera may capture electronic images such as photos and/or video images. The camera may capture the electronic images responsive to an input such as an input provided by a user and/or an application, among other possibilities. The cameras may be located on an external surface of the computing system to promote capture of the electronic images.

DETAILED DESCRIPTION

Privacy is a concern for users of electronic devices such as laptops, cellular phones and other electronic devices including cameras. For instance, some nefarious entities may seek to gain control of a camera in an electronic device for a variety of undesired reasons. For instance, a nefarious entity may acquire control of a camera included in an electronic device and/or gain access to electronic images captured by a camera included in an electronic device unbeknownst to a user of the electronic device. In some approaches, this may be possible because the camera may be a shutter less camera that is in focus (operating within a typical focal range) at all times during operation of the electronic device. For example, in some approaches the camera can be a digital camera mounted so a lens of the camera is visible on an exterior portion of the electronic device (e.g., on a bezel of the computing device) at all times during operation of the electronic device.

Accordingly, the disclosure is directed to the selective defocus of cameras. As detailed herein, selective defocus of cameras can defocus at least a portion of a field of view of a lens of a camera in an electronic device. That is, as used herein, defocus of a lens of a camera refers to causing an object that would otherwise be in focus and therefore readily identifiable (e.g., identifiable as a particular person, object, and/or environment) from the vantage of the lens operating within a typical focal distance in a range of typical focal distances (e.g., a focal distance between 30 centimeters to 1000 meters from the lens) to instead be out of focus and therefore unidentifiable from the vantage of the defocused lens. As used herein, a focal distance refers a distance between the lens in a camera and an image sensor included in the camera.

For instance, in an example an electronic device can include a camera including a lens having a field of view and a focal distance, a defocus switch, and an actuator to adjust the focal distance of the lens to selectively defocus a portion of the field of view of the lens in response to actuation of the defocus switch. As such, selective defocus of cameras can mitigate and/or eliminate a nefarious entities ability to utilize a camera of an electronic device in an undesired manner. Additionally, selective defocus of cameras in response to activation of a defocus switch may be less prone to tampering or corruption by nefarious entities as the defocus switch can be electrically isolated from a main circuit board of an electronic device, in some examples.

Figure 1:
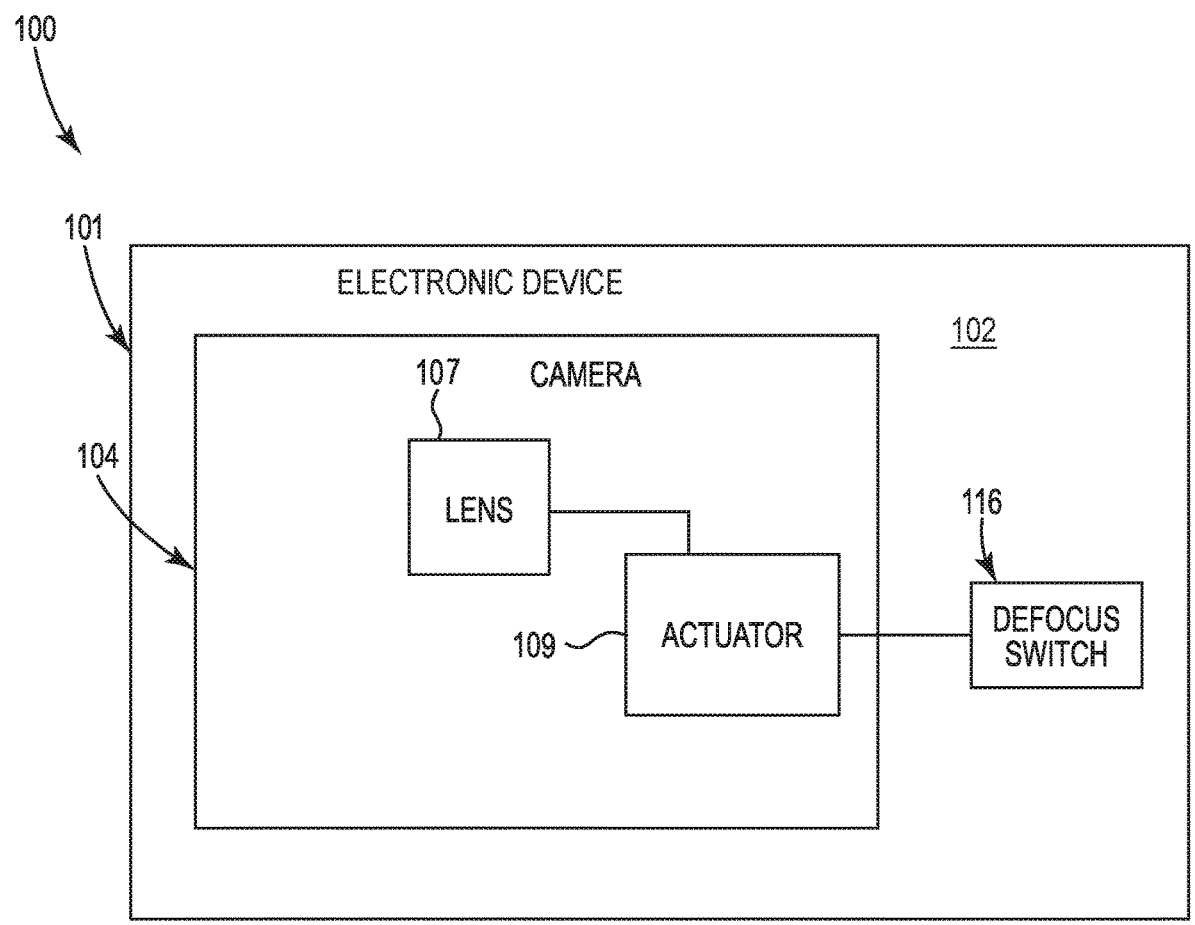
FIG. 1 illustrates an example diagram of an electronic device suitable with selective defocus of cameras according to the disclosure.

FIG. 1 illustrates an example diagram of an electronic device 100 suitable with selective defocus of cameras according to the disclosure. As illustrated in FIG. 1, the electronic device 100 can include a housing 101 having a bezel 102, a camera 104 including, a lens 107, an actuator 109, a controller 108, and a defocus switch 116.

The electronic device 100 can be a mobile phone, a wearable electronic device, a tablet, a laptop computer, a desktop computer, or combinations thereof. In some examples, the electronic device 100 can be an all-in-one (AIO) computer. As used herein, an AIO computer refers to a computer which integrate the internal components into the same case as the display, offer the touch input functionality of the tablet devices while also providing the processing power and viewing area of desktop computing systems. In such examples, the camera 104 can be embedded in the bezel 102 of the AIO computer, as described herein.

The housing 101 can form an exterior surface of an electronic device such as those described herein. In various examples, the housing 101 and/or the bezel 102 can form an internal volume. The camera 104 including the controller 108, the actuator 109, and/or the lens 107, among other possible components such as those described herein, can be disposed in the internal volume. As used herein, "disposed" means a location at which something is physically positioned.

For instance, the internal volume of the electronic device 100 can be sized to receive at least the camera 104 and/or various other electrical/mechanical components that may be included in an electronic device. That is, in various examples, the housing 101 can include additional components such as a display, batter, input/output device, among other types of components. The housing 101 can be formed of fabric, metal, and/or plastic, among other suitable material to promote the selective defocus of cameras.

The bezel 102 refers to a component that surrounds an electronic display (not illustrated) of an electronic device. For instance, the bezel 102 can surrounds a periphery of an electronic display such as a graphical user interface and/or a liquid crystal display included in an electronic device such as a laptop or mobile phone, among other types of electronic device including those described herein. The bezel 102 can be formed of a same or different material than a material forming other portions of the housing 101. For instance, the bezel can be formed of fabric, metal, and/or plastic, among other suitable material to promote ferromagnetic covers.

The housing 101 and/or the bezel 102 can include an opening (not illustrated) extending from an environment surrounding the housing 101 and/or the bezel 102 into an internal volume of the housing 101. The opening can be sized to permit the camera 104, and more specifically the lens 107 in the electronic device 100 to capture electronic images via the opening of the environment surrounding the housing 101.

The camera 104 can be a three-dimensional camera, an infrared camera, a 3D scanner camera, digital camera, and/or other type of camera. For instance, in various examples, the camera 104 is a digital camera. Digital cameras are filmless; they sense light and color via an electronic device known as an image sensor and produce as an output a computer file which describes the image using data bits (1's and 0's) arranged in a meaningful, predefined format. Such computer files can be stored on a small mass-storage medium inside the camera itself, such as a magnetic floppy disc, or a magneto-optical disk commonly referred to as a compact disc (CD), or otherwise, for later transference to a digital system for image processing and/or display. Alternatively, or in addition, the image file can be sent directly to a digital system via a transmission medium. The term "image file" is thus used herein to refer to the recorded file of a digital still camera, a digital video camera or a digital holographic camera.

In some examples, the camera 104 is a shutterless digital camera. As used herein, the term "shutterless" refers to an electronic camera that is without an integral shutter included in the camera to cover the lens. In contrast to approaches that rely on cameras including a shutter, the disclosure relates to thinner electronic devices that employ selective defocus of cameras and that are not susceptible to attacks by nefarious entities that may seek to gain control of a shutter employed in other approaches.

The lens 107 refers to an optical lens or assembly of lenses used in conjunction used in conjunction with an image sensor, as described herein, to make images of objects either on media capable of storing an image electronically. The lens 107 has a field of view. As used herein, a field of view refers to the extent of the observable world that is seen at any given moment. For instance, the field of view can be a particular solid angle through which an image sensor such as those described herein are able to detect electromagnetic radiation which passes through the lens 107. The lens 107 can be a fixed lens or can be a telescoping lens or other type of mechanically adjustable lens. As mentioned, the lens 107 can be included in a shutterless camera.

The actuator 109 can selectively defocus a portion of the field of view (e.g., an entire field of view) of the lens 107. In some examples, the actuator 109 can selectively defocus a portion of the field of view adjusting a focal distance of the lens. That is, the focal distance can be adjusted from a range of typical focal distances (e.g., a typical focal distance range of about 30 centimeters to about 300 meters) by increasing or decreasing a focal distance of the lens 107 to be outside of the typical focal distance range.

The lens 107 can be a zoom lens or other type of lens with an adjustable focal distance. For instance, in some examples, the focal distance of the lens 107 can be adjusted to a focal distance that is from 0.1 centimeters to 20 centimeters from the lens 107. All individual values and subranges between 0.1 centimeters to 20 are included. For instance, in some examples, focal distance of the lens 107 can be adjusted to a focal distance that is from 0.1 centimeters to 1.5 centimeters from the lens 107

Similarly, in some examples, a focal distance of the lens 107 can adjusted by the actuator 109 so a focal distance of the lens 107 is greater than 500 meters or greater than 1000 meters from the lens 107, among other possibilities. For instance, the focal distance of the lens can be adjusted to a focal distance in a range from 1000 meters to 1 billion meters (or greater). All individual values and subranges between 1000 meters to 1 billion meters (or greater) are included. In either case, adjusting the focal distance of the lens 107 to be outside of the range of typical focal distances can desirably cause at least a portion of the field of view of the lens to selectively defocus and thereby mitigate or eliminate a nefarious entities ability to use the camera 104 in an undesired fashion.

In various example, the actuator 109 can selectively defocus a portion of the field of view in response to actuation of the defocus switch 109, as described herein. For example, actuation of the defocus switch 109 can cause an electronic signal to be sent to the controller 109 which can send an electronic control signal to cause the actuator 109 to adjust a focal distance of lens 107. Examples of suitable actuators for the actuator include rotary voice coil actuators (VCM), variable charge motion actuators, among other types of actuators. That is, in some examples the actuator 109 can be a VCM such a cylindrical VCM or an arc-segment VCM, among other possibilities.

In some examples, the defocus switch 116 can be a dedicated physical switch (i.e., a button) on external portion of the housing 101 of the electronic device 100. For instance, the dedicated physical switch can be a cap active button and/or an analogue button located on an external portion of the housing 101. As such, the defocus switch can be readily accessible to an end user of the electronic device 100 and thereby selective defocus of the camera 104 (e.g., in response to actuation of the dedicated physical switch). For instance, in some examples, the defocus switch 109 can be an analogue button (or other type of switch) included in the bezel 102 of the electronic device, among other possible locations on an external portion of the housing 101. However, the disclosure is not so limited.

Rather, in some examples the defocus switch 116 can be a capacitive switch such as those include in a touch screen or other display of the electronic device and/or the defocus switch 116 can be a key or combination of keys (a shortcut) included on a keyboard or other input device (mouse) of the electronic device 100. Regardless, a 'dedicated' button refers to a button having a capability to cause selective defocus of a camera in response to actuation of the button.

In some examples, the defocus switch 116 can be electrically isolated from an operating system of the electronic device. For instance the defocus switch can derives its power (to complete the switch when defocus switch is in an "ON" position) from a different power source than the operating system of the electronic device. For example, as mentioned, in some examples the electronic device 100 can be an AIO computer. In such examples, the defocus switch is electrically isolated from an operating system of the AIO. The controller 109 can include a processing resource and non-transistory machine readable instructions executable by the processing resource to promote aspects of selective defocus of cameras, as described herein in greater detail with respect to FIG. 3.

Figure 2:
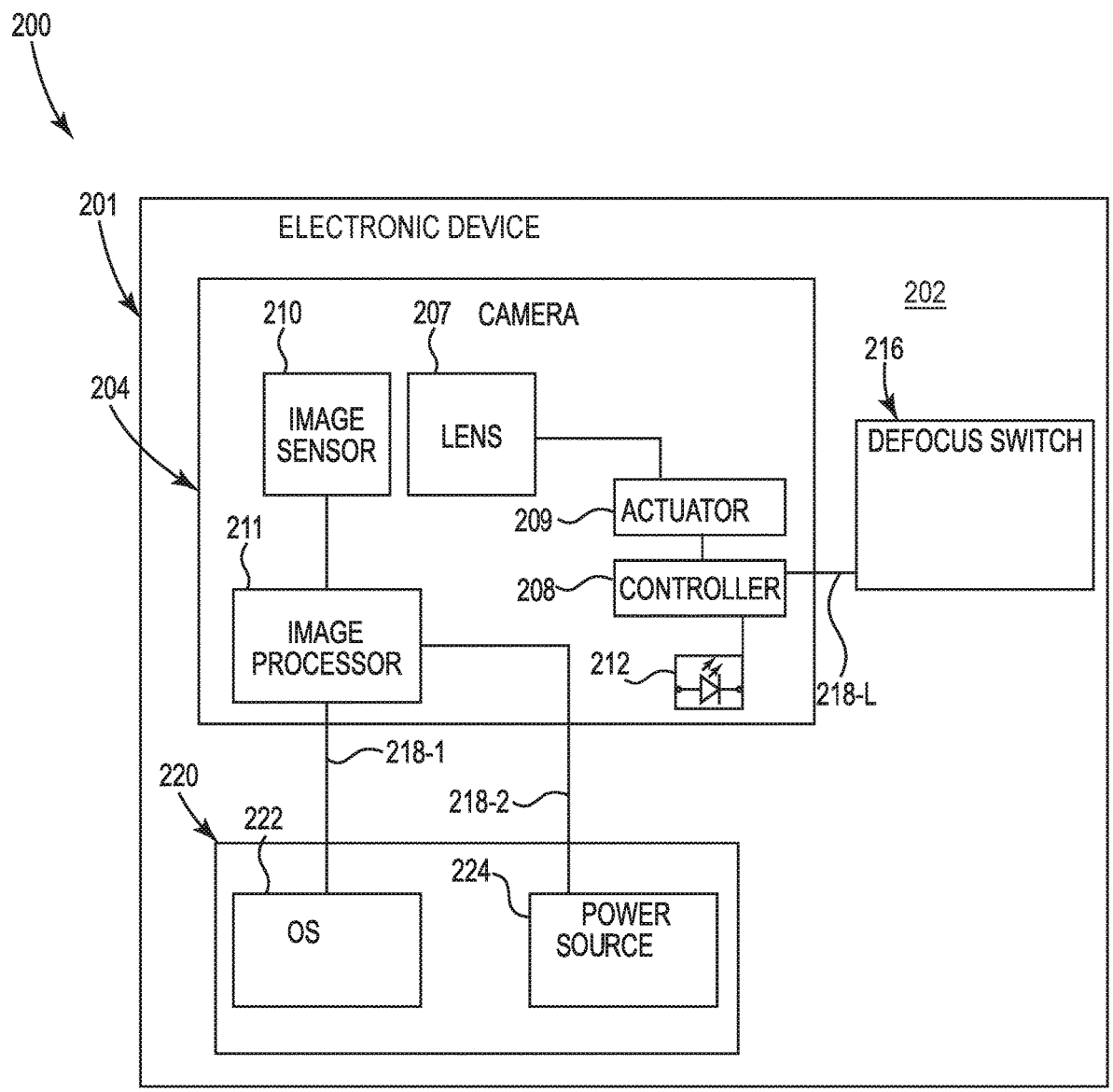
FIG. 2 illustrates another example diagram of an electronic device suitable with selective defocus of cameras according to the disclosure.

FIG. 2 illustrates another example diagram of an electronic device 200 suitable with selective defocus of cameras according to the disclosure. As illustrated in FIG. 2, the electronic device 200 can include a housing 201, a camera 204, a defocus switch 216, and a circuit board 220. Similar to FIG. 1, the housing can include a bezel 202, as described herein. The camera 204 can include lens 207, a controller 208, and an actuator 209, as described herein.

The image sensor 210 refers to a sensor capable of sensing information (e.g., light) that constitutes an image and conveying the captured information. For instance, the image sensor 210 can capture information and convey the captured information to the image processor 211 which can further process and/or store the captured information, Examples of suitable image sensors include a charge coupled device (CCD), and a complementary metal-oxide semiconductor (CMOS) sensor, among other types of image sensors. Examples of suitable image processors include a digital signal processor (DSP) such as those used for image processing in digital cameras, among other types of image processors. While FIG. 2 illustrated the image processor 211 as included in the camera the disclosure is not so limited. Rather, the image processor 211 can be at a different location such as at a different location in the housing 201 but no in the camera 204 or can be located remote from an in communication with the electronic device 200.

Indicator 212 refers to any suitable visual indicator including powered visual indicators and unpowered visual indicators. Examples of powered visual indicators include various powered light sources such as light emitting diodes. Powered visual indicators can provide an indication by way of turning on/off, changing an intensity of light emitted, and/or changing a color of light emitted, among other possibilities, Examples of nonpowered visual indicators included mirrors, symbols, numeric characters, alphabetic characters, alpha-numerical characters, among other possible nonpowered visual indicators.

While FIG. 2, illustrates the electronic device 220 as including visual Indicator 212 it is understood that the electronic device can include additional visual indicators or may be without a visual indicator. For instance, in some examples, visual Indicator 212 can be a powered visual indicator while the electronic device can include a nonpowered visual indicator at a different location than visual Indicator 212, among other possibilities.

Regardless of the type of indicator, indicator 212 can be coupled to the camera 204 or otherwise included in the electronic device 220 to indicate when the lens 207 of the camera 204 is defocused. For instance, indicator can be a visual indicator such as a LED to emit visual light (within a spectrum visible to an unaided human eye) when the camera is defocused, among other possibilities.

The circuit board 220 (i.e., a main circuit board) refers to circuitry which includes or is coupled to an operation system 222 of the electronic device 200, For example, the circuit board 220 can be a printed circuit board, among other possibilities. In various examples, the circuit board 220 can include an operating system (OS) 222 which can cause the electronic device to perform a variety of functions including capturing images via the lens 207.

As illustrated in FIG. 2, the circuit board can include a power source 224. The power source 224 refers to a source of direct current (DC) and/or a source of alternating current (AC). Examples of power sources include batteries, AC/DC power converters, and/or DC/AC power converters, among other types of power sources. The power source 224 can power at least a portion of the electronic device. For instance, the power source 224 can power the camera 204 and/or the circuit board such as the OS 222 included on the circuit board 220.

As illustrated in FIG. 2, the housing 201, the camera 204, the defocus switch 216, and the circuit board 220 can be coupled together. For instance, the circuit board 220 can be directly coupled via an interconnect 218-1 and/or via interconnect 218-2 to the camera 204. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies. Similarly, the defocus switch can be directly coupled via an interconnect 218-L to the camera 216. However, it is noted that a power source such a power source 224 which provides power to the circuit board (i.e., the main circuit board) is not directly coupled to the defocus switch and, notably, does not provide power to the defocus switch 216, in some examples.

In this manner, the defocus switch can desirably be 'decoupled' from the circuit board 220 and the power source 224 and thereby electrically isolate the defocus switch from an operating system 222 powered by the power source 224 of the electronic device 200. For instance, in some examples, the electronic device 200 can be an all-in-one computer and the defocus switch 216 can be electrically isolated from an operating system of the all-in-one computer.

In such examples, the defocus switch can be a powered defocus switch with its own power source (not shown) that is separate from the power source 224 on the circuit board 220. However, in some examples the defocus switch can be a non-power defocus switch such as those described herein.

Figure 3:
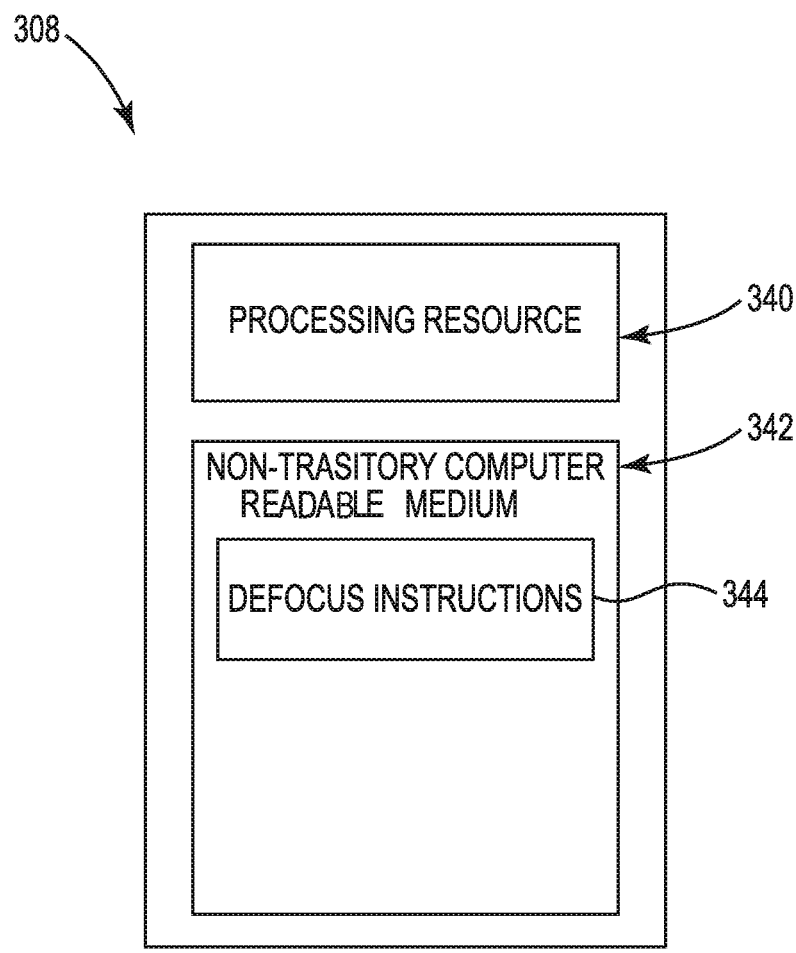
FIG. 3 illustrates a diagram of an example of a controller suitable with selective defocus of cameras according to the disclosure.

FIG. 3 illustrates a diagram an example of a controller 308 suitable with selective defocus of cameras according to the disclosure. As illustrated in FIG. 3, the controller 308 can include a processing resource 340 and a non-transitory computer readable medium 342.

The processing resource 340 can be a central processing unit (CPU), a semiconductor based microprocessor, and/or other hardware devices suitable for retrieval and execution of machine-readable instructions such as those stored on the non-transitory computer readable medium 342.

Non-transitory computer readable medium 342 may be any electronic, magnetic, optical, or other physical storage device that stores executable instructions. Thus, non-transitory computer readable medium 342 may be, for example, Random Access Memory (RAM), an Electrically-Erasable Programmable Read-Only Memory (EEPROM), a storage drive, an optical disc, and the like.

The executable instructions may be "installed" on the controller 308 illustrated in FIG. 3. Non-transitory computer readable medium 342 may be a portable, external or remote storage medium, for example, that allows the controller 308 to download the instructions 342 from the portable/external/remote storage medium. In this situation, the executable instructions may be part of an "installation package". As described herein, non-transitory computer readable medium 342 may be encoded with executable instructions related to selective defocus of cameras. That is, using processing resource 340, non-transitory computer readable medium 342 can instruct defocus instructions 344 to selectively defocus an entire field of view of a lens of a camera in response to actuation of a defocus switch, among other operations.

In various examples, the defocus instructions 344 can defocus an entire field of view of a lens in response to actuation of a defocus switch by adjustment of a focal distance of the lens to a focal distance outside of a range of typical focal distances of a digital camera, as described herein. For instance, in some examples, the defocus instructions 344 can include instructions to selectively defocus the lens by causing adjustment of the focal distance of the lens to a focal distance that is from 0.1 centimeters to 20 centimeters from the lens or to a focal distance that is greater than 500 meters or greater than 1000 meters from the lens, as described herein.

Figure 4:
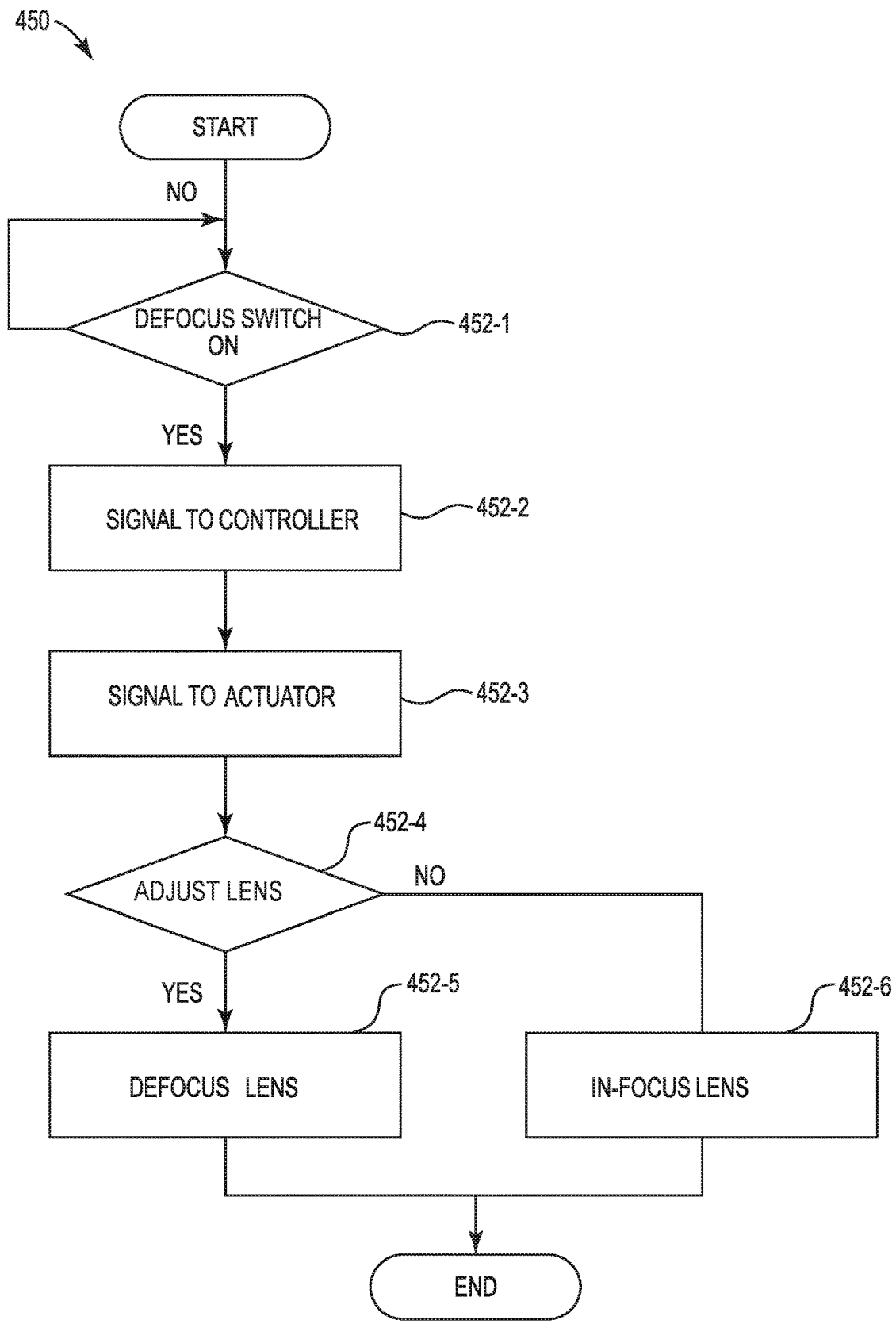
FIG. 4 illustrates a flow diagram of an example implementation of selective defocus of cameras according to the disclosure.

FIG. 4 illustrates a flow diagram 450 of an example implementation of selective defocus of cameras according to the disclosure. As illustrated at 452-1, the flow diagram 450 can include a determination of whether a defocus switch is in an 'on' position. The flow diagram can determine whether the defocus switch is in an 'on' position periodically and/or in response to the defocus switch being actuated to an 'on' position. If yes and the defocus switch is in the 'on' position, the flow diagram proceeds to 452-2, if no than the flow diagram returns to the start.

At 452-2 the flow diagram 450 can send a signal to a controller. The controller can include defocus instructions and can send a signal such as defocus signal to an actuator as shown at 452-3. As shown at 452-4, a determination whether to adjust the lens to a focal distance outside of a typical focal distance in a range of typical focal distances can be made based on the signal from the controller. If yes, as shown at 452-5 the actuator can adjust the lens to a focal distance outside of a range of typical focal distances of a digital camera. Alternatively, if no, as shown at 452-6 a focal distance of the lens remains at a focal distance in a range of typical focal distances of a digital camera. In either case, the flow diagram 450 can proceed to its end.

Figure 5:
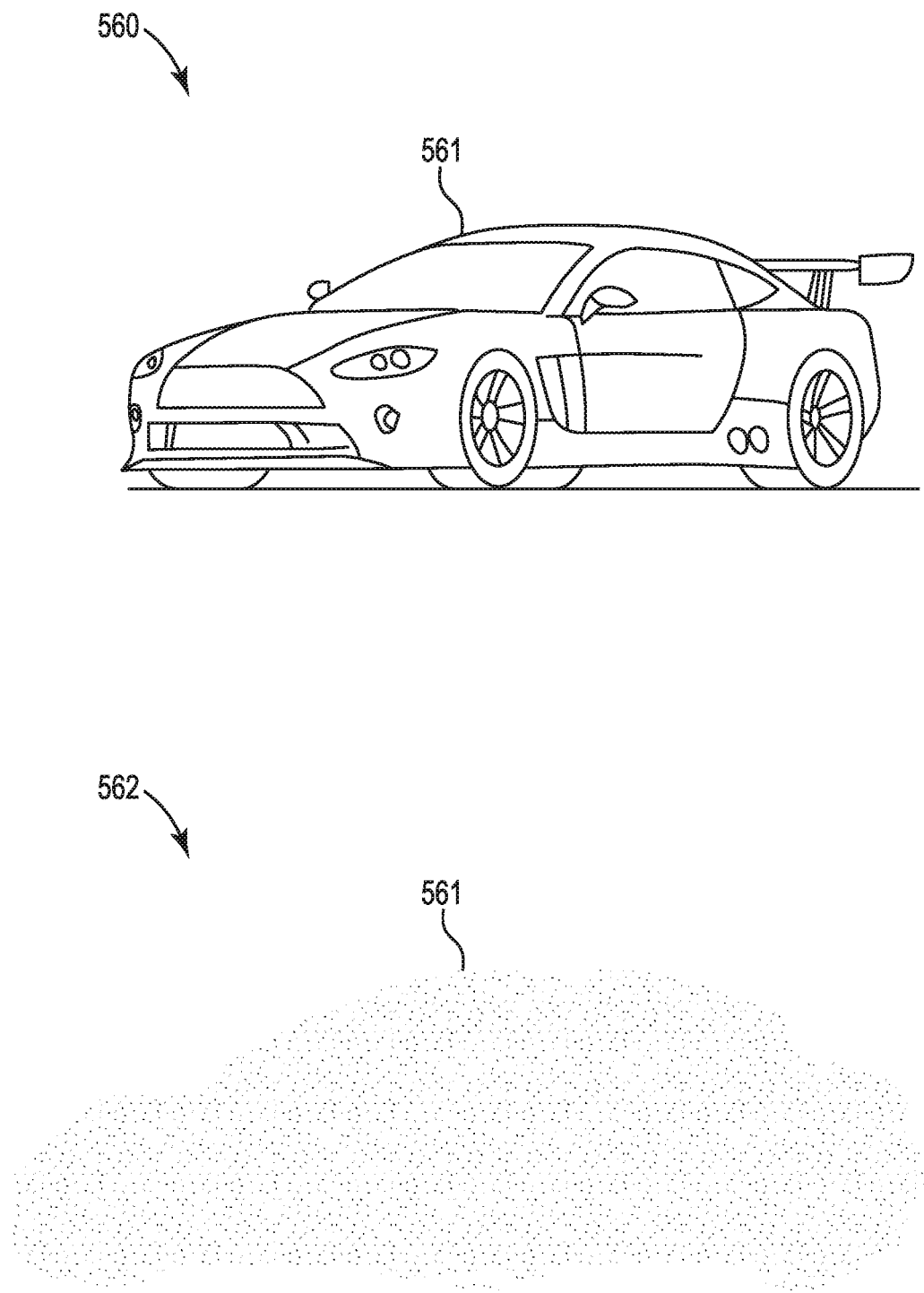
FIG. 5 illustrates an example of an object in an example implementation of selective defocus of cameras according to the disclosure.

FIG. 5 illustrates an example of an object in an example implementation of selective defocus of cameras according to the disclosure. As illustrated in FIG. 5, an in-focus lens observing an object at a focal distance (represented by 560) within a range of typical focal distances can permit readily identifying the object 561 herein illustrated as an automobile.

In contrast, a defocused lens observing the object at a focal distance (represented by 562) that is outside the range of typical focal distances and therefore is unidentifiable from the vantage of the defocused lens. Note, for ease of illustration the object 561 observed at focal distance 562 that is defocused is represented by a collection of dots. However, it is understood that a defocused objected can be observed in a variety of defocused manners and yet remain unidentifiable from the vantage of the defocused lens. As illustrated in FIG. 5, an entire field of view of a lens can be defocused. However, in some examples, a portion (left, right, center, top, right, and/or bottom, etc.) can be defocused while another portion of the field of view remains in focus.

Figure 6:
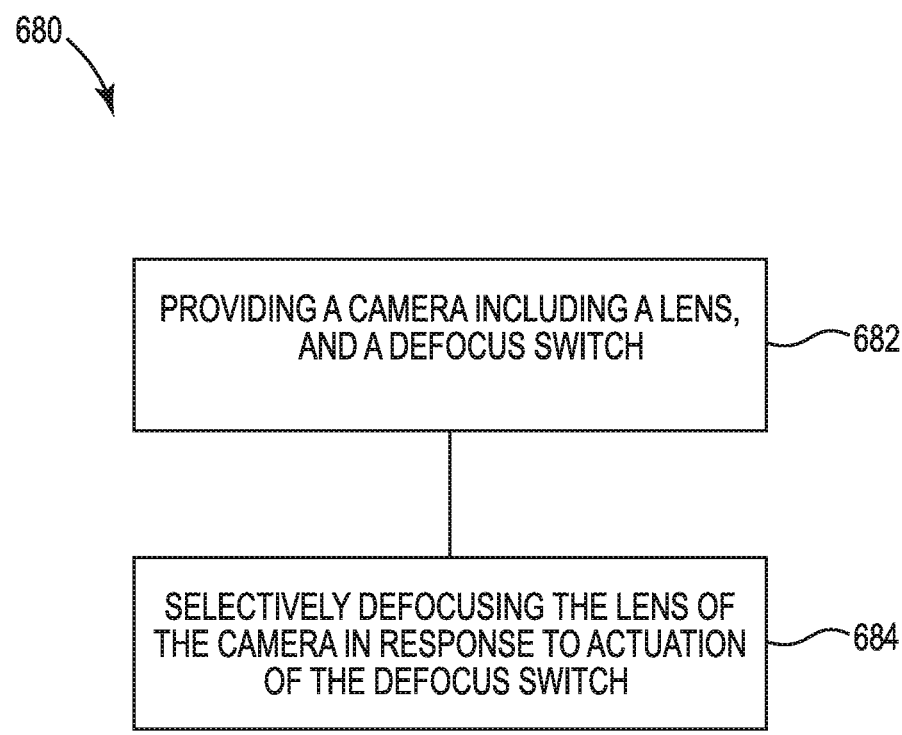
FIG. 6 illustrates a flow diagram of an example of a method according to the disclosure.

FIG. 6 illustrates a flow diagram of an example of a method 680 according to the disclosure. As illustrated at 682, the method 680 can include providing a camera including a lens and a defocus switch. As used herein, the term "providing" refers to manufacture or procurement of an unassembled component intended for assembly into a larger system including a plurality of components such as an electronic device including those described herein.

As illustrated at 684, the method 680 can include selectively defocusing the lens of the camera in response to actuation of the defocus switch, as described herein. For instance, in some examples, such actuation can include actuation of a physical hardware switch from a first position ('off') to a second position ('on') position to cause a camera to selectively defocus the lens of the camera.

It will be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples (e.g., having different thickness) may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 116 may refer to element 116 in FIG. 1 and an analogous element may be identified by reference numeral 216 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

What is claimed:

1. An electronic device, comprising:
    a camera including a lens having a field of view and a focal distance;
    a defocus switch;
    an actuator to adjust the focal distance of the lens; and
    a controller comprising:
        a processing resource; and
        non-transitory machine readable instructions executable by the processing resource to selectively defocus an entire field of view of the lens in response to actuation of the defocus switch by adjustment of a focal distance of the lens to a focal distance that is from 0.1 centimeters to 20 centimeters from the lens.

2. The electronic device of claim 1, wherein the defocus switch is a dedicated physical switch on external portion of the electronic device.

3. The electronic device of claim 2, wherein the dedicated physical switch is a capacitive button.

4. The electronic device of claim 2, wherein the dedicated physical switch is an analog button.

5. The electronic device of claim 4, wherein the analog button further comprises an analogue button included in a bezel of the electronic device.

6. The system of claim 1, wherein the actuator further comprises a voice coil motor (VCM) actuator.

7. The electronic device of claim 1, wherein the electronic device further comprises an all-in-one (AIO) computer, and wherein the camera is embedded in a bezel of the AIO computer.

8. The electronic device of claim 1, wherein defocus switch is electrically isolated from an operating system of the all-in-one computer.

9. The electronic device of claim 1, further comprising a visual indicator to emit light to visually indicate when the lens of the camera is defocused.

10. A controller comprising:
    a processing resource; and
    non-transitory machine readable instructions executable by the processing resource to selectively defocus an entire field of view of a lens of a digital camera in response to actuation of a defocus switch by adjustment of a focal distance of the lens to a focal distance outside of a range of typical focal distances of a digital camera.

11. The controller of claim 10, including instructions to selectively defocus the lens by causing adjustment of the focal distance of the lens to a focal distance that is from 0.1 centimeters to 20 centimeters from the lens.

12. The controller of claim 10, including instructions to selectively defocus the lens by causing adjustment of the focal distance of the lens to a focal distance that is from 0.1 centimeters to 1.5 centimeters from the lens.

13. The controller of claim 10, including instructions to selectively defocus the by causing adjustment of the focal distance of the lens to a focal distance that is greater than 500 meters from the lens.

14. A method, comprising:
   providing a camera including a lens and a defocus switch;
   actuation of a defocus switch; and
   selectively defocusing an entire field of view of the lens of the camera by adjustment of a focal distance of the lens to a focal distance that is greater than 500 meters from the lens in response to the actuation of the defocus switch.

15. The method of claim 14, wherein actuation further comprises actuation of a dedicated physical switch from a first position to a second position.

\* \* \* \* \*